(12) United States Patent
Bruzzo

(10) Patent No.: US 7,673,475 B2
(45) Date of Patent: Mar. 9, 2010

(54) ABSORPTION COOLING SYSTEM FOR A MOTOR VEHICLE

(75) Inventor: Vitale Bruzzo, Vicenza (IT)

(73) Assignee: Ecoclim SA (CH)

( * ) Notice: Subject to any disclaimer, the term of this patent is extended or adjusted under 35 U.S.C. 154(b) by 257 days.

(21) Appl. No.: 11/572,682

(22) PCT Filed: Jun. 8, 2005

(86) PCT No.: PCT/IB2005/001809

§ 371 (c)(1),
(2), (4) Date: Jan. 25, 2007

(87) PCT Pub. No.: WO2006/013407

PCT Pub. Date: Feb. 9, 2006

(65) Prior Publication Data

US 2008/0028786 A1 Feb. 7, 2008

(30) Foreign Application Priority Data

Jul. 30, 2004 (EP) .................................. 04405485

(51) Int. Cl.
*F25B 15/00* (2006.01)
(52) U.S. Cl. ................. 62/476; 62/235.1; 62/480
(58) Field of Classification Search .................. 62/476, 62/478, 480, 335, 235.1, 101
See application file for complete search history.

(56) References Cited

U.S. PATENT DOCUMENTS

| | | | |
|---|---|---|---|
| 4,253,310 A * | 3/1981 | Sokolov ........................ 62/79 |
| 4,285,211 A * | 8/1981 | Clark ........................... 62/335 |
| 4,445,340 A | 5/1984 | Reimann | |
| 5,518,069 A * | 5/1996 | Maier-Laxhuber et al. ..................... 165/104.12 |
| 5,934,090 A | 8/1999 | Kashiwagi et al. | |
| 6,260,364 B1 | 7/2001 | Moon et al. | |

FOREIGN PATENT DOCUMENTS

FR  2805493 A  8/2001

* cited by examiner

*Primary Examiner*—Melvin Jones
(74) *Attorney, Agent, or Firm*—Galbreath Law Offices, P.C.; John A. Galbreath

(57) ABSTRACT

The invention concerns an absorption cooling system for a motor vehicle using water as coolant and an absorbent. Said system comprises a circuit designed to ensure circulation of the coolant, when the engine is stopped, from the evaporator (3) to the absorber (4) passing through the electromagnetic valve (10) through the continued operation of the evaporator pump (7) for a predetermined duration and through maintaining the electromagnetic valve (10) in open position after the engine has stopped for another predetermined duration before it is closed. The evaporator pump (7) is kept in operation upon closure of the electromagnetic valve (10) so as to allow the coolant to circulate in the circuit from the evaporator (3) to the boiler (1) passing through the exchanger (6). Said system enables, when the engine is stopped, the zones containing residual deposits of absorbent to be diluted thereby preventing crystallization of said residual deposits.

5 Claims, 3 Drawing Sheets

ABSORPTION COOLING SYSTEM FOR A MOTOR VEHICLE

The present invention relates to an absorption cooling system intended for a motor vehicle using water as a refrigerant and a salt as absorbent, comprising timer means so that, immediately the motor stops, an effective device prevents the residual deposits of the absorbent from crystallizing in the pipes.

Absorption cooling systems are well explained in the state of the art. FIG. 1 illustrates the principle of these systems. They mainly comprise a boiler (1), a condenser (2), an evaporator (3), an absorber (4), a pump (5) for the refrigerant solution, a heat exchanger (6), a pump (7) of the evaporator, a pump (8) of the absorber, an expansion valve (9), a solenoid valve (10) and a boiler level monitor (11). These systems are strictly in a vacuum. The machine operation is based on the triple point of water (liquid, solid, steam at 0 bar and 0° C.).

To operate, the boiler (1) is filled with a mixture of at least two miscible substances (the initial mixture is approximately 50% water and 50% lithium bromide), called a binary mixture. This mixture is heated to approximately 80° C. in the boiler (1). Under the effect of the heat, and at such a pressure, the water boils and evaporates, being directed to the condenser (2). The latter, cooled by an external intervention, condenses the steam which becomes liquid. The heat in the boiler (1) has raised the pressure in the latter and in the condenser (2) to approximately 75 mbar. The liquid produced passes through an expansion valve (9) and arrives in the evaporator (3) where the pressure is approximately 7 mbar. At this pressure, the liquid evaporates and produces cold, approximately 6° C.

In the boiler (1) there remains a solution that is less water-rich and contains more salt, commonly called lean solution. Because of the pressure difference between the boiler (1) (75 mbar) and the absorber (4), said solution flows into said absorber (4) through the exchanger (6). In the absorber (4), the lean solution absorbs the steam coming from the evaporator (3), the duly recomposed solution is sent to the boiler (1) via the pump (5) and the cycle recommences.

The heat exchanger (6) placed between the boiler (1) and the absorber (4) provides on the one hand cooling of the lean solution from 80° C. to 60° C. and on the other hand preheating of the rich solution from 50° C. to approximately 70° C. A level monitor (11), placed in the boiler (1), drives the solenoid valve (10) and the solution pump (5). The solenoid valve (10) is closed when the motor stops and so prevents the boiler (1) from emptying completely into the absorber (4). The evaporator (3) and the absorber (4) are both provided with a pump (7, 8) which recycles the refrigerant in the evaporator (3) and the absorber (4), so optimizing the efficiency of each of the elements. The absorber (4) is normally cooled by an external source.

This type of system comes up against a major problem in the form of crystallization. This phenomenon occurs when the lean solution exceeds a salt-concentration threshold (approximately 63%) or when said solution is raised to a temperature less than a set point temperature (approximately 35° C.).

To overcome the problems that arise when the lean solution exceeds this salt-concentration threshold, or when said solution is raised to a temperature less than the set point temperature, there are various systems that are described in the state of the art.

For example, U.S. Pat. No. 3,626,711 illustrates a system comprising a valve closed in normal time, the opening of which is controlled by a sensor which transmits a signal when the temperature of the concentrated solution has reached a set point value. At this moment, the opening of a valve releases the refrigerant into the pipes that can contain absorbent deposits in order to dilute the latter and so avoid the crystallization effect.

However, this system does not operate in the case of frequent accidental or programmed stoppages of the cooling system.

Even so, in the case where such a cooling system is installed on board a motor vehicle, provided with a device described in WO 01/18463 and WO 01/18366, a reliable and effective means for avoiding the crystallization is essential to overcome the problems of frequent stoppages of a vehicle.

U.S. Pat. No. 5,934,090 describes a device which, in case of unprogrammed stoppage of the system, dilutes the residual deposits located in the pipes caused by the absorbent solution (lithium bromide) by sending into said pipes a certain quantity of refrigerant. However, this system has the drawback of being relatively complex since the quantity of refrigerant let into the pipes is calculated there according to the concentration of the absorbent liquid. In practice, the crystallization is directly linked to the external temperature and to the concentration of the absorbent liquid. The lowering of the concentration of the lithium bromide contained in the absorbent liquid by the addition of refrigerant prevents crystallization. Furthermore, such a system is relatively costly.

The aim of the present invention is to propose an absorption cooling system for a motor vehicle using water as refrigerant and an absorbent, so that, when the motor stops, an effective device prevents the crystallization of the residual deposits of the absorbent in the pipes while retaining a simple and inexpensive mechanism which avoids having to calculate the quantity of refrigerant liquid according to the concentration of the absorbent liquid.

According to the invention, this aim is achieved through the addition of a circuit intended to ensure the flow of the refrigerant, immediately the motor stops, from the evaporator, to the absorber, via a first solenoid valve. This is accomplished on the one hand by keeping the second pump of the evaporator running for a predefined time, and on the other hand by keeping the first solenoid valve in the open position after the motor stops for another predefined time before its closure, in order to dilute the areas containing residual deposits of the absorbent to prevent the crystallization of said residual deposits.

The invention is described and compared to the state of the art below using an example and referring to the appended drawings, in which.

Figure 1:
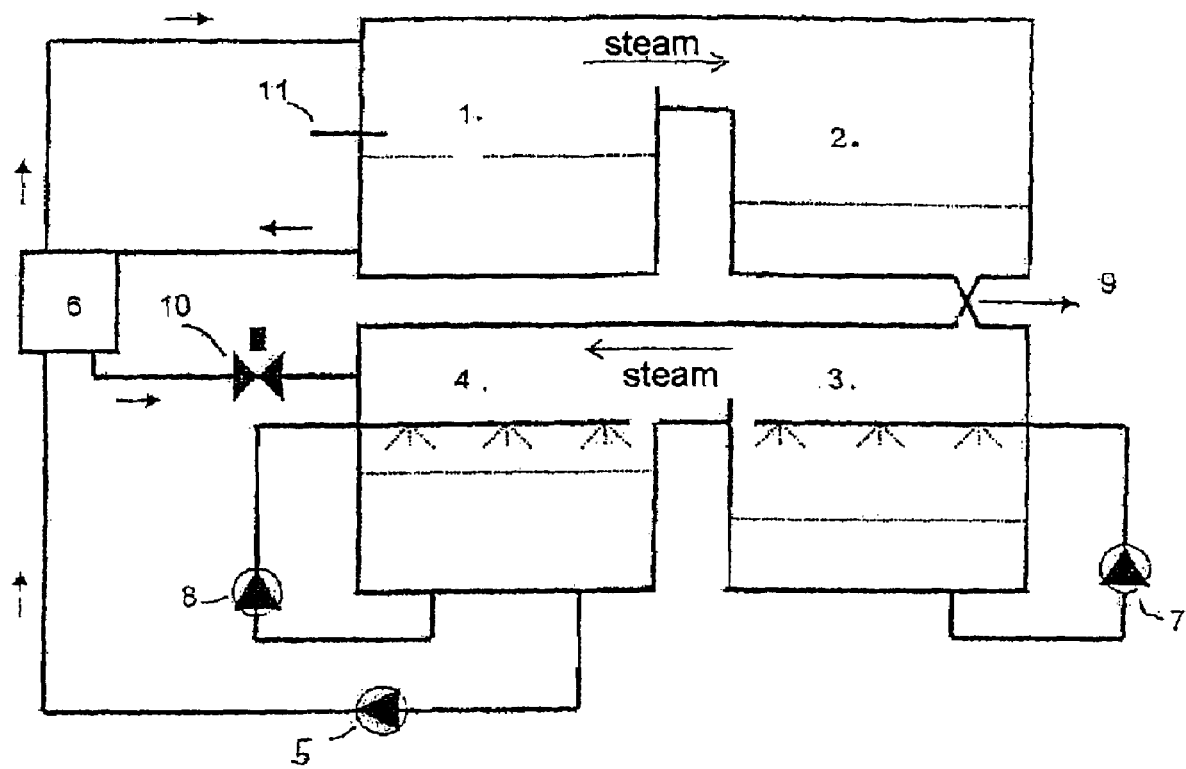
FIG. 1 illustrates a conventional cooling system covered by the state of the art, and the sole aim of which is to facilitate the understanding of the invention.
Figure 2:
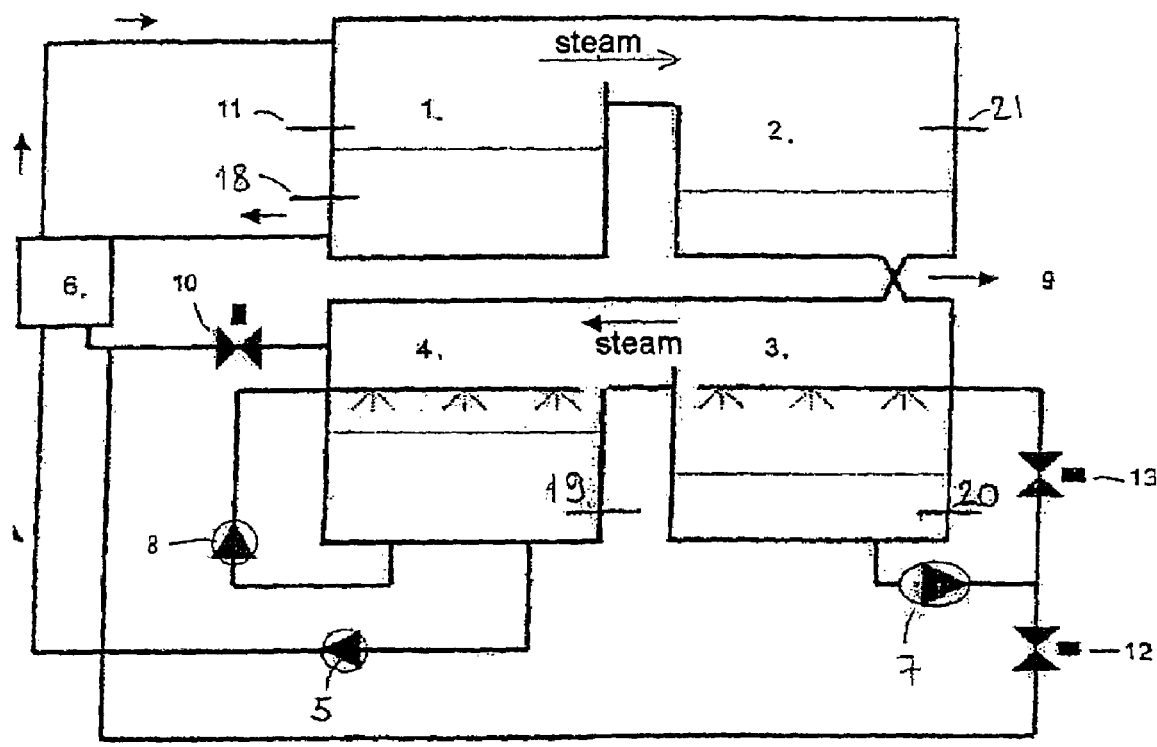
FIG. 2 illustrates a cooling system with the addition, according to the invention, of a crystallization device in case the system is stopped.

The invention proposes an extension of the device described above by the addition of two solenoid valves (12, 13) mounted in parallel at the output of the evaporator (3) as illustrated by FIG. 2. The solenoid valve (13) is open and the solenoid valve (12) is closed when the motor is running so as to create a closed circuit in the evaporator to circulate the refrigerant, via the pump (7) of the evaporator, indefinitely. Immediately the motor stops, the two solenoid valves (12, 13) change state simultaneously and the refrigerant fluid is redirected by a pipe to the solenoid valve (10) which is positioned in series between the boiler (1) and the absorber (4), thanks to the fact that the pump (7) of the evaporator (3), which is powered by a car battery, is kept running. Said solenoid valve (10) which in normal time is closed when the motor stops to avoid the emptying of said boiler (1) into said absorber (4), remains open immediately the motor stops for a sufficient time (for example 5 seconds) to allow the refrigerant (water) to clean the solenoid valve (10) and the pipe going to the absorber (4), which are areas with high risks of crystallization.

When the solenoid valve (10) is closed, the pump (7) of the evaporator (3) is kept running for a sufficient time, for example 15 seconds counting from the moment the motor stops, to enable the refrigerant (water) to circulate in the part going from the solenoid valve (10) to the boiler (1) via the heat exchanger (6) for a sufficient time, for example 10 seconds, to free this area of residual deposits of the absorbent, so avoiding crystallization.

The opening of these two solenoid valves (12, 13) is controlled by a relay actuated when the motor stops.

This system, according to the invention, is provided with four level monitors (18, 19, 20, 21) placed respectively in the boiler (1), the condenser (2), the evaporator (3) and the absorber (4). If a low level is detected in one of the above-mentioned tanks, the decrystallization process is carried out.

Figure 3:
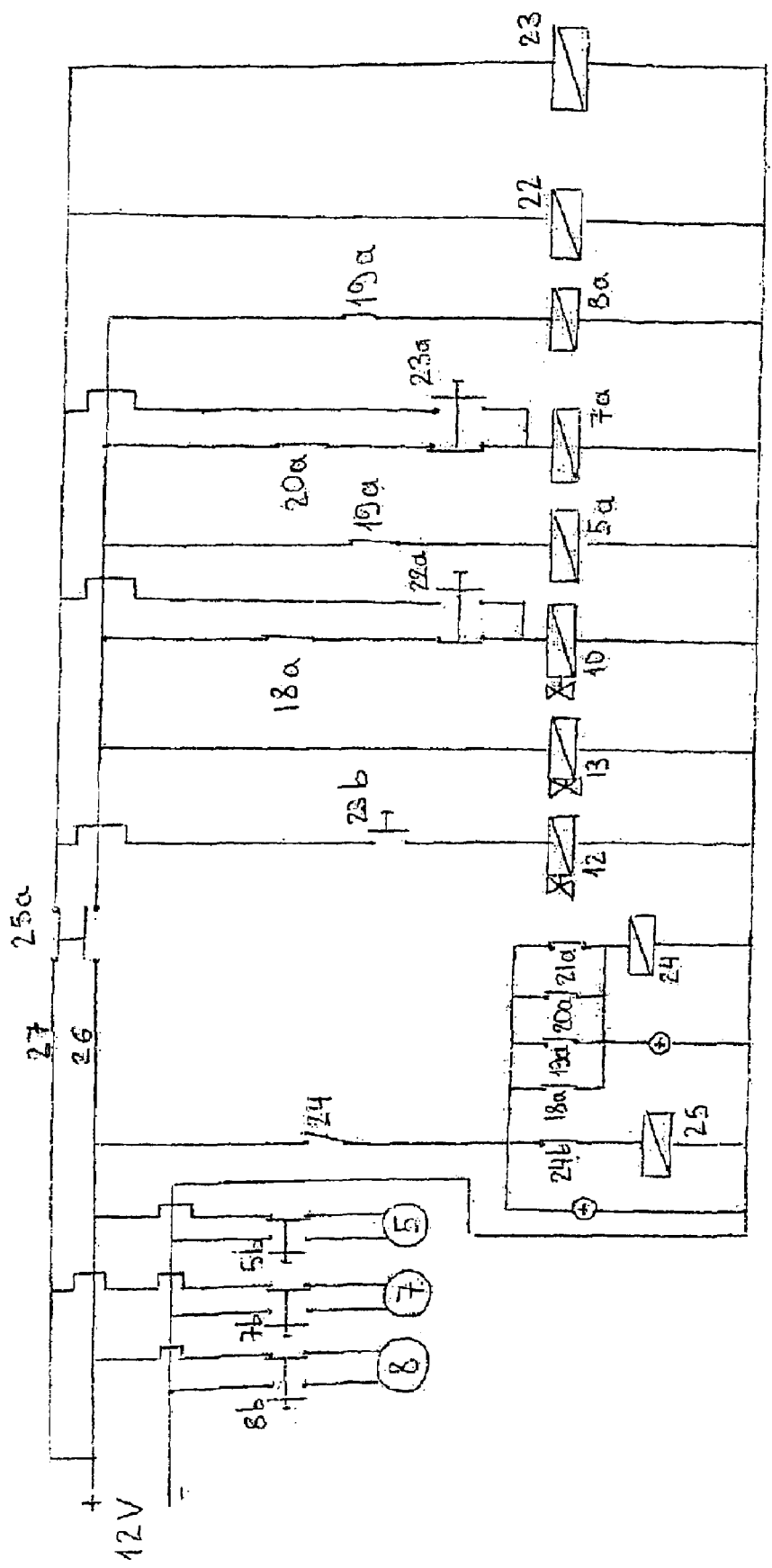
FIG. 3 is an electrical circuit diagram of the cooling system according to the invention.

FIG. 3 represents the simplified electrical circuit diagram of such a device. The making of the contact (24) opens the solenoid valve (13) via the relay (25) which closes the main line and actuates the pumps (5, 7, 8) through the relays (5a, 7a and 8a) which close the contacts (5b, 7b, 8b). The vehicle is running and the air conditioning is operating.

When the vehicle is stopped, the relay (25) opens the main line (26) and closes the auxiliary line (27), which on the one hand causes the closure of the solenoid valve (13) and on the other hand causes the pumps (5, 8) to be stopped by the opening of the relays (5a, 8a). At the same instant, the timers (22, 23) are simultaneously activated. The timer (22) closes the contact (22a) and opens the solenoid valve (10) for a predetermined time (for example 5 seconds). The timer (23) closes the contacts (23b, 23a) exciting the control relay of the solenoid valve (12) which immediately opens said solenoid valve (12) for another predetermined time (for example 15 seconds) and keeps the pump (7) running via the relay (7a). For a predetermined time (for example 5 seconds), the refrigerant (water) circulates in the solenoid valve (10) towards the absorber (4), so cleaning this part of the system that is particularly prone to crystallization.

After this predefined time, the solenoid valve (10) is finally closed and, for 10 more seconds, the refrigerant (water) circulates in the part going from the solenoid valve (10) to the boiler (1) via the exchanger (6), freeing this area of this high salt concentration solution, so avoiding crystallization.

In case of a level or pressure alarm (18, 19, 20 and 21), the contacts (18a, 19a, 20a or 21a) are closed and the relay (24) actuates the contact (24b) which opens the contact (25a). At the same time, the alarm lamp lights up.

The times indicated are by no means limiting and can vary according to the volumes to be handled.

The invention claimed is:

1. A motor vehicle absorption cooling system using water as refrigerant and an absorbent, comprising a boiler (1), a condenser (1), an evaporator (3), an absorber (4) where a residual solution (absorbent) which comes from the boiler (1) via a heat exchanger (6) and a first solenoid valve (10) is mixed again with the refrigerant, a first pump (5) which returns the recomposed solution from the absorber (4) to the boiler (1) via the heat exchanger (6) in order to perform a complete cycle, a second pump (7) of the evaporator which ensures a cycling of the refrigerant in said evaporator (3), a third pump (8) of the absorber which ensures the cycling of the solution in said absorber (4), and an expansion valve (9) positioned between the condenser (2) and the evaporator (3), characterized in that said system comprises a circuit intended to ensure the flow of the refrigerant, from the moment a motor of said motor vehicle stops, from the evaporator (3) to the absorber (4) via a first solenoid valve (10), on the one hand by keeping the second pump (7) of the evaporator running for a predefined time, and on the other hand by keeping the first solenoid valve (10) in the open position after the motor stops for another predefined time before its closure, in order to dilute an area containing a residual deposit of the absorbent to prevent a crystallization of said residual deposit, characterized in that said circuit comprises a second solenoid valve (13) which is in an open position when the system is operating in order to ensure the cycling of the refrigerant in the evaporator (3) and a third solenoid valve (12) arranged between the evaporator (3) and the absorber (4) and which is closed when the system is operating, said third and second solenoid valves (12, 13) being opened and closed respectively immediately after the system stops so as to ensure the flow of the refrigerant, from the evaporator (3) to the absorber (4) via the first solenoid valve (10).

2. The motor vehicle absorption cooling system as claimed in claim 1, characterized in that said second pump (7) of the evaporator (3) is arranged so as to remain running on closure of the first solenoid valve (10) for a predefined time in order to allow the refrigerant to circulate in the circuit running from the evaporator (3) to the boiler (1) via the exchanger (6), thus diluting an area containing a residual deposit of the absorbent and thus preventing a crystallization of said residual deposit.

3. The motor vehicle absorption cooling system as claimed in claim 2, characterized in that the predefined time for keeping the second pump (7) of the evaporator running from the time the motor stops is longer than the predefined time for keeping the first solenoid valve (10) in the open position immediately after the motor stops.

4. The motor vehicle absorption cooling system as claimed in claim 3, characterized in that the predefined time for keeping the second pump (7) of the evaporator running from the time the motor stops is two to four times longer than the predefined time for keeping the first solenoid valve (10) in the open position immediately after the motor stops.

5. The motor vehicle absorption cooling system as claimed in claim 3, characterized in that the system uses lithium bromide as the absorbent.

* * * * *